MEMORANDUM ATTACHMENT FOR TELEPHONES

Filed Jan. 28, 1952 2 Sheets-Sheet 1

George D. Mohundro
INVENTOR.

BY Clarence A. O'Brien
and Harvey B. Jacobson
Attorneys

Dec. 8, 1953 G. D. MOHUNDRO 2,661,961

MEMORANDUM ATTACHMENT FOR TELEPHONES

Filed Jan. 28, 1952 2 Sheets-Sheet 2

George D. Mohundro
INVENTOR.

BY Clarence A. O'Brien
and Harvey B. Jacobson
Attorneys

Patented Dec. 8, 1953 2,661,961

UNITED STATES PATENT OFFICE 2,661,961

MEMORANDUM ATTACHMENT FOR TELEPHONES

George D. Mohundro, East Alton, Ill.

Application January 28, 1952, Serial No. 268,544

4 Claims. (Cl. 281—11)

The present invention relates to new and useful improvements in memorandum attachments for use with telephones whereby a roll of memorandum paper is supported for feeding onto a platen or writing surface at the front of a telephone base.

An important object of the invention is to provide a spring contracted extensible sub-base attachable under the base of a telephone and enclosing a roll of memorandum paper at the rear of the sub-base and from which the paper is fed under the telephone to a platen or writing surface at the front of the telephone.

Another object is to provide a novel paper feeding means enclosed in a hollow platen at the front of the telephone.

A further object is to provide adaptor units held in the extensible sub-base for use with round or ovate shaped bases of telephones and utilizing the spring means for holding the units in a contracted assembled position in clamping engagement with the telephone.

A still further object is to provide a device of this character of simple and practical construction, which is neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
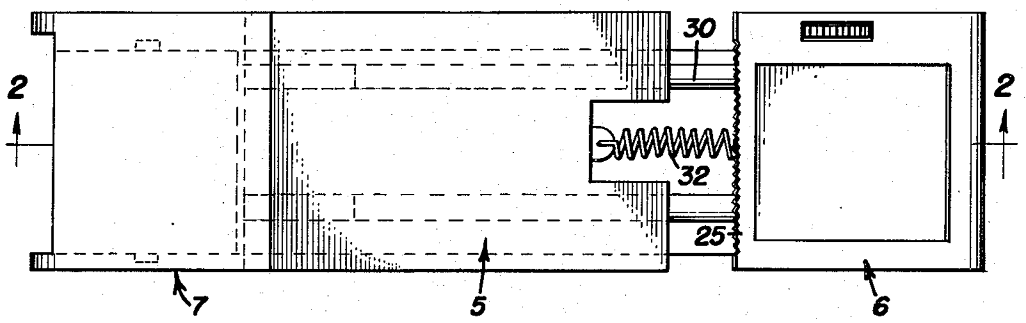
Figure 1 is a top plan view of the extensible paper holding and platen units of the sub-base.

Referring now to the drawings in detail, wherein for the purpose of illustration I have disclosed a preferred embodiment of my invention, the numeral 5 designates the telephone sub-base generally and which includes a front platen or writing surface unit 6 and a rear paper roll supporting unit 7.

Rear unit 7 comprises a housing 10 rising at the rear end of a base plate 11. Housing 10 is formed with a loading opening 12 for placing a roll of paper 13 therein for mounting in bearings 14 and 15 in the opposite sides of the housing. The free end of the paper passes through an opening 16 in the bottom of the housing to opposing guide channels 17 at the bottom of base plate 11 to feed the paper forwardly under the latter. The paper is held in an elevated position above a supporting surface on which the device is placed by means of felt pads 18 secured to the underside of base plate 11 at the side edges of the latter.

The free end of the paper passes forwardly at the front end of base plate 11 to enter a horizontal opening 19 in the lower rear wall of a hollow body 20 which forms the front platen or writing unit 6. An idler roller 21 is rotatably mounted in the front portions of body 20 and around which the paper passes to a front transverse slot 22 in a sloping sunken top 23 of the body to feed the paper outwardly on top of the platen or writing unit 6 and rearwardly through a rear transverse slot 24 under a cutter 25 which projects rearwardly at the top of the platen unit.

A transverse shaft 26 is rotatably mounted in the sides of body 20 and to which a pair of rubber or other suitable friction rollers or wheels 27 are secured in frictional engagement with the underside of the paper at its edge portions. A knurled operating wheel 28 is also secured to shaft 26 with the uppermost portion of the wheel exposed in an opening 29 in the top of body 20 for turning the wheel by the fingers of a person.

A pair of guide rods 30 project rearwardly from body 20 for sliding in bores 31 in the front ends of base plate 11 and a coil spring 32 is connected to body 20 and base plate 11 to contract the front and rear units 6 and 7 against the front and rear respectively of the base 33 of a telephone placed on base plate 11 and between the units. Cutter 25 overlies the front of telephone base 33 and a lip 34 is formed at the upper front portion of paper housing 10 to overlie the rear of the telephone base.

A pair of arcuate adaptor units 35 and 36 of hollow construction are shaped to fit closely at the opposite sides of a round or ovate-shaped telephone 37 and are provided with dowels 38 which project from the front and rear ends of the adaptor units to slidably enter openings 39 and 40 in body 20 and roller housing 10 respectively to anchor the adaptor units thereto for completely enclosing the base of the telephone. The opposing sides of the adaptor units are open to receive the flared base portion of the telephone and the bottom 41 of the adaptors underlies the base of the telephone.

Figure 2:
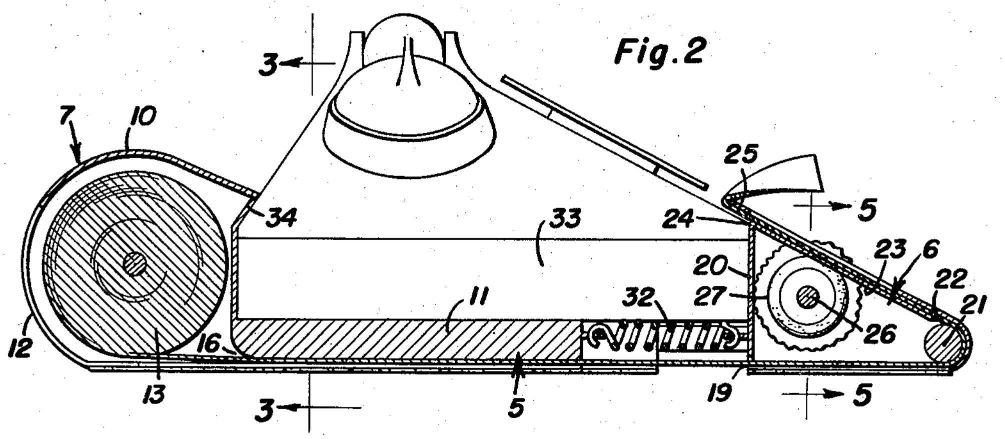
Figure 2 is a longitudinal sectional view taken on a line 2—2 of Figure 1.
Figure 3:
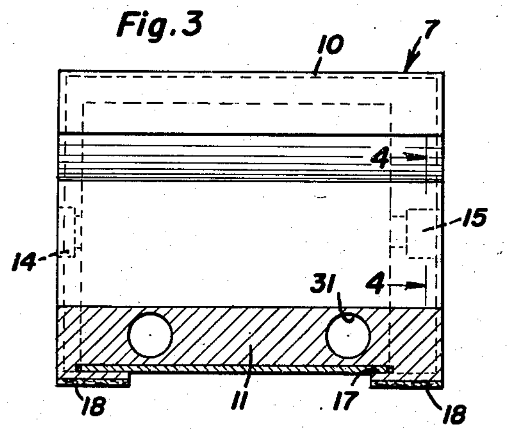
Figure 3 is a transverse sectional view taken on a line 3—3 of Figure 2.
Figure 4:
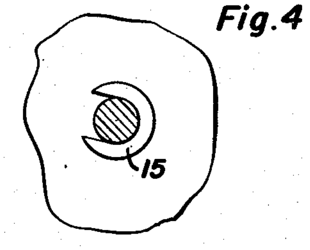
Figure 4 is an enlarged fragmentary sectional view taken on a line 4—4 of Figure 3 and showing one of the bearings for the paper roll.
Figure 5:
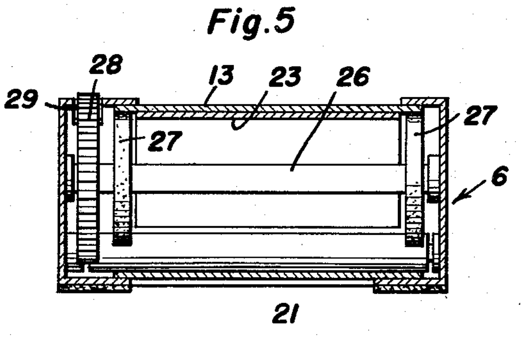
Figure 5 is a transverse sectional view taken on a line 5—5 of Figure 2.
Figure 8:
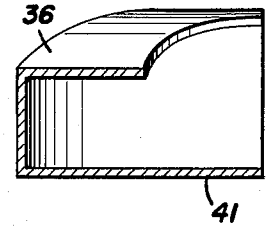
Figure 8 is an enlarged transverse sectional view taken on a line 8—8 of Figure 6.
Figure 6:
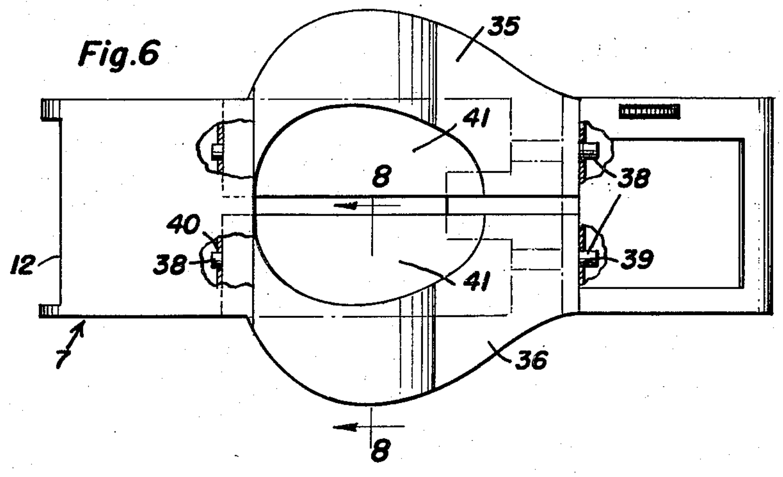
Figure 6 is a top plan view showing the adaptor units assembled with the sub-base and with parts broken away and shown in section.

In the operation of the device, and when desiring to use the same with a conventional square shaped telephone base, as shown in Figure 2, the front and rear units 6 and 7 are pulled outwardly in extended position and the telephone 33 placed therebetween. Spring 32 contracts or pulls the units inwardly against the front and rear sides of the telephone to hold the units tightly thereon.

After loading a roll of paper 13 in housing 10 and feeding the free end of the paper forwardly in guide channels 17 under the base plate 11 and into front unit 6, the wheel 28 may be turned to feed fresh portions of the paper on top of sloping platen 23 for writing thereon.

Figure 7:
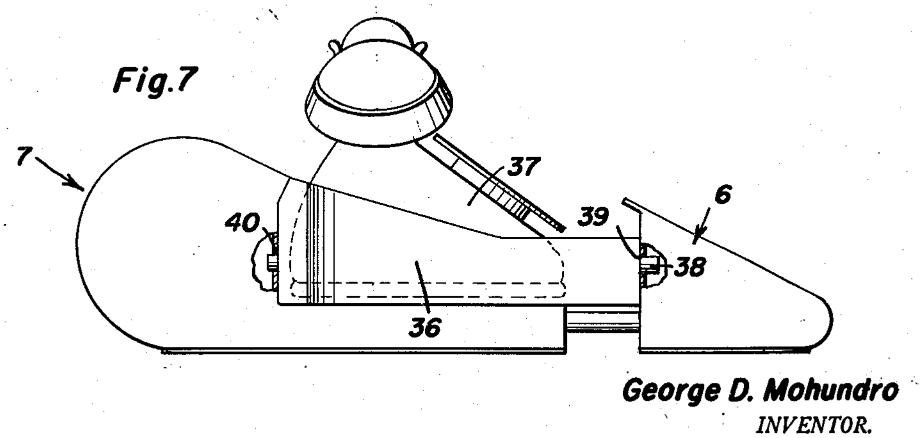
Figure 7 is a side elevational view thereof.

When the attachment is to be used with round or oval telephone bases, such as shown in Figure 7 the adaptors 35 and 36 are placed between the front and rear units 6 and 7 for embracing the base of the telephone at the sides thereof.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described my invention, what is claimed as new is:

1. A memorandum attachment for telephones comprising front and rear units, spring means urging said units toward one another for clamping a telephone therebetween, said rear unit being adapted for supporting a roll of paper in a position for feeding paper forwardly therefrom to the front unit, and a paper feed roller within the front unit for feeding paper to the upper surface thereof, a platform extending from one of said units for supporting a telephone, said spring means being disposed below the upper surface of said platform, said platform having a pair of longitudinal bores opening into one end thereof, the other of said units having longitudinally extending rods slidably received in said bores to guidingly retain the units in longitudinal alignment with one another.

2. A memorandum attachment for telephones comprising front and rear units, means extensibly connecting the units to each other, spring means connected to said units for drawing the same toward one another and a pair of side units removably clamped between the front and rear units, said rear unit including means for supporting a roll of paper and said front unit including paper feed means for feeding the paper from the former to and onto the top of the latter, said units having facing end walls, said facing end walls having apertures, said side units having projecting studs engaged in said apertures, said side units having complementally arcuated facing surfaces contoured to the shape of the sides of a telephone base and being adapted to frictionally engage such base.

3. A memorandum attachment for telephones comprising front and rear units, means extensibly connecting the units to one another, resilient means interconnecting said units and drawing them toward one another, a pair of side units removably clamped between said front and rear units, said side units having complementally arcuated facing surfaces forming a socket corresponding to the shape of a telephone base and adapted to frictionally receive a telephone base therein, said rear unit including means for supporting a roll of paper and said front unit including paper feed means for feeding the paper from the former to and onto the top of the latter.

4. A memorandum attachment for telephones comprising front and rear units, spring means urging said units toward one another for clamping a telephone therebetween, said rear unit being adapted for supporting a roll of paper in a position for feeding paper forwardly therefrom to the front unit, and a paper feed roller within the front unit for feeding paper to the upper surface thereof, a platform extending from one of said units for supporting a telephone, said spring means being disposed below the upper surface of said platform, said platform having a pair of longitudinal bores opening into one end thereof, the other of said units having longitudinally extending rods slidably received in said bores to guidingly retain the units in longitudinal alignment with one another, said front and rear units having upstanding facing walls complementally shaped to the contour of the front and rear portions of a telephone.

GEORGE D. MOHUNDRO.

References Cited in the file of this patent

UNITED STATES PATENTS

| Number | Name | Date |
|---|---|---|
| 895,834 | Aungst | Aug. 11, 1908 |
| 1,354,693 | Ryan | Oct. 5, 1920 |
| 1,390,705 | Hattersley | Sept. 13, 1921 |
| 1,644,665 | Beck | Oct. 11, 1927 |
| 2,511,771 | Fagan | June 13, 1950 |
| 2,592,066 | Pratt | Apr. 8, 1952 |